United States Patent
Sharifi et al.

(10) Patent No.: US 12,284,417 B2
(45) Date of Patent: Apr. 22, 2025

(54) MEDIA ARBITRATION

(71) Applicant: Google LLC, Mountain View, CA (US)

(72) Inventors: Matthew Sharifi, Kilchberg (CH); Victor Carbune, Zürich (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/506,085

(22) Filed: Nov. 9, 2023

(65) Prior Publication Data

US 2024/0196053 A1    Jun. 13, 2024

Related U.S. Application Data

(63) Continuation of application No. 18/064,921, filed on Dec. 12, 2022, now Pat. No. 11,838,582.

(51) Int. Cl.
| | | |
|---|---|---|
| *G06F 15/16* | (2006.01) | |
| *H04N 21/258* | (2011.01) | |
| *H04N 21/442* | (2011.01) | |
| *H04W 4/029* | (2018.01) | |

(52) U.S. Cl.
CPC . *H04N 21/44209* (2013.01); *H04N 21/25891* (2013.01); *H04W 4/029* (2018.02)

(58) Field of Classification Search
CPC ...... H04N 21/44209; H04N 21/25891; H04W 4/029
USPC ....................................................... 709/219
See application file for complete search history.

(56) References Cited

U.S. PATENT DOCUMENTS

| | | | | |
|---|---|---|---|---|
| 8,903,526 | B2 * | 12/2014 | Beckhardt | H04L 65/612 |
| | | | | 700/94 |
| 8,908,879 | B2 * | 12/2014 | Bates | H04L 67/10 |
| | | | | 381/79 |
| 9,304,735 | B2 * | 4/2016 | Bates | G06F 3/162 |
| 9,395,950 | B2 * | 7/2016 | Bates | H04N 21/26258 |
| 9,395,951 | B2 * | 7/2016 | Bates | H04N 21/26258 |
| 9,400,632 | B2 * | 7/2016 | Beckhardt | G11B 27/105 |
| 9,507,560 | B2 * | 11/2016 | Beckhardt | H04L 65/80 |
| 9,875,081 | B2 * | 1/2018 | Meyers | G06F 3/167 |
| 9,940,091 | B2 * | 4/2018 | Beckhardt | H04R 5/04 |
| 9,977,647 | B2 * | 5/2018 | Bates | H04N 21/26258 |
| 10,008,183 | B2 * | 6/2018 | Ueda | G06F 3/14 |
| 10,181,323 | B2 * | 1/2019 | Beckhardt | G06F 3/165 |

(Continued)

*Primary Examiner* — Alicia Baturay
(74) *Attorney, Agent, or Firm* — Honigman LLP; Brett A. Krueger; Grant Griffith

(57) ABSTRACT

A method using media arbitration includes, while a first assistant-enabled device is performing a first long-standing operation, determining the first assistant-enabled device satisfies a co-presence condition with a second assistant-enabled device, and determining that the second assistant-enabled device is performing a second long-standing operation that conflicts with the first long-standing operation performed by the first assistant-enabled device. Based on determining that the first long-standing operation and the second long-standing operation conflict, the method also includes executing an operation arbitration routine to identify one or more compromise operations for at least one of the first assistant-enabled device or the second assistant-enabled device to perform, and instructing the first assistant-enabled device or the second assistant-enabled device to perform a selected compromise operation among the identified compromise operations.

18 Claims, 7 Drawing Sheets

(56) References Cited

U.S. PATENT DOCUMENTS

| | | | | |
|---|---|---|---|---|
| 10,277,981 B1* | 4/2019 | Frank | ............... | G10L 15/28 |
| 10,338,881 B2* | 7/2019 | Bates | ............... | H04N 21/8106 |
| 10,425,780 B1* | 9/2019 | Devaraj | ............... | H04W 4/08 |
| 10,499,146 B2* | 12/2019 | Lang | ............... | G06F 3/162 |
| 10,560,796 B2* | 2/2020 | Beckhardt | ............... | H04L 65/80 |
| 10,614,807 B2* | 4/2020 | Beckhardt | ............... | G10L 15/32 |
| 10,616,726 B1* | 4/2020 | Freeman, II | ............... | H04W 8/02 |
| 10,762,900 B2* | 9/2020 | Ben-Dor | ............... | G10L 15/1822 |
| 10,783,883 B2* | 9/2020 | Mixter | ............... | G06F 3/167 |
| 10,878,812 B1* | 12/2020 | Helwani | ............... | G10L 25/84 |
| 10,956,118 B2* | 3/2021 | Bates | ............... | H04L 67/10 |
| 11,003,419 B2* | 5/2021 | Edmonds | ............... | G06F 3/167 |
| 11,006,234 B2* | 5/2021 | Matthias | ............... | H04S 3/008 |
| 11,024,303 B1* | 6/2021 | Devaraj | ............... | G10L 15/1815 |
| 11,044,570 B2* | 6/2021 | Laaksonen | ............... | H04S 7/303 |
| 11,175,883 B2* | 11/2021 | Kannan | ............... | G05B 15/02 |
| 11,248,927 B2* | 2/2022 | Mahajan | ............... | G01C 21/3661 |
| 11,265,652 B2* | 3/2022 | Kallai | ............... | H03G 5/165 |
| 11,284,214 B2* | 3/2022 | Beckhardt | ............... | H04S 7/308 |
| 11,308,961 B2* | 4/2022 | Beckhardt | ............... | G06F 3/167 |
| 11,340,085 B2* | 5/2022 | Mahajan | ............... | G01C 21/3629 |
| 11,361,765 B2* | 6/2022 | Park | ............... | G10L 15/10 |
| 11,379,184 B2* | 7/2022 | Edmonds | ............... | G06F 3/0482 |
| 11,393,473 B1* | 7/2022 | Fenster | ............... | G06F 3/167 |
| 11,402,231 B2* | 8/2022 | Mahajan | ............... | G06F 16/64 |
| 11,531,789 B1* | 12/2022 | Eberhardt | ............... | G06F 30/18 |
| 11,557,294 B2* | 1/2023 | Myers | ............... | G06F 3/167 |
| 11,743,675 B2* | 8/2023 | Beckhardt | ............... | H04L 65/764 |
| | | | | 700/94 |
| 11,838,582 B1* | 12/2023 | Sharifi | ............... | G06F 3/167 |
| 11,893,306 B2* | 2/2024 | Bates | ............... | H04N 21/458 |

* cited by examiner

MEDIA ARBITRATION

CROSS-REFERENCE TO RELATED APPLICATIONS

This U.S. patent application is a continuation of, and claims priority under 35 U.S.C. § 120 from, U.S. patent application Ser. No. 18/064,921, filed on Dec. 12, 2022. The disclosure of this prior application is considered part of the disclosure of this application and is hereby incorporated by reference in its entirety.

TECHNICAL FIELD

This disclosure relates to media arbitration across two or more devices.

BACKGROUND

A user's manner of interacting with an assistant-enabled device is designed primarily, if not exclusively, by means of voice input. For example, a user may ask a device to perform an action including media playback (e.g., music or podcasts), where the device responds by initiating playback of audio that matches the user's criteria. In instances where an environment includes more than one device (e.g., a smart speaker), media playback from each of the devices in the environment may overlap and compete with one another.

SUMMARY

One aspect of the disclosure provides a computer-implemented method that when executed on data processing hardware causes the data processing hardware to perform operations that include, while a first assistant-enabled device is performing a first long-standing operation, determining the first assistant-enabled device satisfies a co-presence condition with a second assistant-enabled device, and determining that the second assistant-enabled device is performing a second long-standing operation that conflicts with the first long-standing operation performed by the first assistant-enabled device. Based on determining that the first long-standing operation and the second long-standing operation conflict, the operations also include executing an operation arbitration routine to identify one or more compromise operations for at least one of the first assistant-enabled device or the second assistant-enabled device to perform, and instructing the first assistant-enabled device or the second assistant-enabled device to perform a selected compromise operation among the identified compromise operations.

Implementations of the disclosure may include one or more of the following optional features. In some implementations, the operations further include obtaining proximity information for the second assistant-enabled device, where determining the first assistant-enabled device satisfies the co-presence condition with the second assistant-enabled device is based on the proximity information for the second assistant-enabled device. In these implementations, the operations may further include obtaining a respective volume level of audible content output from at least one of the first assistant-enabled device or the second assistant-enabled device. Here, determining the first assistant-enabled device satisfies the co-presence condition is further based on the respective volume level of the audible content output from at least one of the first assistant-enabled device or the second assistant-enabled device. Additionally or alternatively, obtaining proximity information for the second assistant-enabled device includes at least one of receiving an indication of a wireless communication signal transmitted from the second assistant-enabled device and captured by a sensor of the first assistant-enabled device, receiving connection data indicating the first assistant-enabled device is connected to the second assistant-enabled device, or receiving an indication that the first assistant-enabled device captured an audible or inaudible signal output from the second assistant-enabled device. In these implementations, the operations may further include, based on the proximity information for the second assistant-enabled device, determining that a proximity of the second assistant-enabled device relative to the first assistant-enabled device satisfies a proximity threshold. Here, determining the first assistant-enabled device satisfies the co-presence condition with the second assistant-enabled device is based on the determination that the proximity of the second assistant-enabled device relative to the first assistant-enabled device satisfies the proximity threshold.

In some examples, based on determining that the first assistant-enabled device satisfies the co-presence condition with the second assistant-enabled device and determining the second assistant-enabled device is performing the second long-standing operation that conflicts with the first long-standing operation, the operations further include suppressing performance of at least one of the first long-standing operation performed by the first assistant-enabled device or the second long-standing operation performed by the second assistant-enabled device for a threshold amount of time. After the threshold amount of time has lapsed, the operations also include determining that the first assistant-enabled device still satisfies the co-presence condition with the second assistant-enabled device. Here, executing the operation arbitration routine is based on determining that the first assistant-enabled device still satisfies the co-presence condition with the second assistant-enabled device after the threshold amount of time has lapsed.

In some implementations, the first long-standing operation performed by the first assistant-enabled device includes playback of media content from the first assistant-enabled device, and the second long-standing operation performed by the second assistant-enabled device includes playback of media content from the second assistant-enabled device. In these implementations, executing the operation arbitration routine includes identifying a first type of the media content played back from the first assistant-enabled device, identifying a second type of the media content played back from the second assistant-enabled device, and determining that the first type of the media content matches the second type of the media content. Based on determining that the first type of the media content matches the second type of the media content, the operations also include determining a third long-standing operation including one of the one or more identified compromise operations that merges the media content played back from the first and second assistant-enabled devices, and instructing the first assistant-enabled device or the second assistant-enabled device to perform the selected compromise operation includes instructing each of the first and second assistant-enabled devices to perform the third long-standing operation.

In some examples, executing the operation arbitration routine identifies one of the one or more compromise operations as performing one of the first long-standing operation or the second long-standing operation on the first assistant-enabled device and the second assistant-enabled device simultaneously, and instructing at least one of the first assistant-enabled device or the second assistant-enabled device to perform the selected compromise operation includes instructing the first and second assistant-enabled devices to perform the one of the first long-standing operation or the second long-standing operation simultaneously. In some implementations, executing the operation arbitration routine identifies one of the one or more compromise operations as adjusting respective media content playback settings of at least one of the first assistant-enabled device or the second assistant-enabled device, and instructing at least one of the first assistant-enabled device or the second assistant-enabled device to perform the selected compromise operation includes instructing at least one of the first assistant-enabled device or the second assistant-enabled device to adjust the respective media content playback settings. In some examples, executing the operation arbitration routine includes obtaining a capability of the first assistant-enabled device, obtaining a capability of the second assistant-enabled device, and identifying the one or more compromise operations for the at least one of the first assistant-enabled device or the second assistant-enabled device to perform based on the capability of the first assistant-enabled device and the second assistant-enabled device. Additionally or alternatively, executing the operation arbitration routine includes identifying a device type associated with the first assistant-enabled device, identifying a device type associated with the second assistant-enabled device, and identifying the one or more compromise operations for the at least one of the first assistant-enabled device or the second assistant-enabled device to perform based on the device type associated with the first assistant-enabled device and the device type associated with the second assistant-enabled device.

In some implementations, executing the operation arbitration routine includes identifying a user preference associated with the first assistant-enabled device, identifying a user preference associated with the second assistant-enable device, and identifying the one or more compromise operations for the at least one of the first assistant-enabled device or the second assistant-enabled device to perform based on the user preference associated with the first assistant-enabled device and the user preference associated with the second assistant-enabled device. In some examples, after executing the operation arbitration routine to identify the one or more compromise operations for the at least one of the first assistant-enabled device or the second assistant-enabled device to perform, the operations further include determining a respective score associated with each compromise operation among the one or more compromise operations, and selecting the compromise operation among the one or more compromise operations as the compromise operation having the highest respective score. In these examples, the operations may further include determining that the respective score associated with the selected compromise operation satisfies a threshold. Here, instructing the first assistant-enabled device and the second assistant-enabled device to perform the compromise operation is based on the respective score associated with the selected compromise operation satisfying the threshold.

Another aspect of the disclosure provides a system including data processing hardware and memory hardware in communication with the data processing hardware. The memory hardware stores instructions that when executed by the data processing hardware cause the data processing hardware to perform operations that include, while a first assistant-enabled device is performing a first long-standing operation, determining the first assistant-enabled device satisfies a co-presence condition with a second assistant-enabled device, and determining that the second assistant-enabled device is performing a second long-standing operation that conflicts with the first long-standing operation performed by the first assistant-enabled device. Based on determining that the first long-standing operation and the second long-standing operation conflict, the operations also include executing an operation arbitration routine to identify one or more compromise operations for at least one of the first assistant-enabled device or the second assistant-enabled device to perform, and instructing the first assistant-enabled device or the second assistant-enabled device to perform a selected compromise operation among the identified compromise operations.

This aspect may include one or more of the following optional features. In some implementations, the operations further include obtaining proximity information for the second assistant-enabled device, where determining the first assistant-enabled device satisfies the co-presence condition with the second assistant-enabled device is based on the proximity information for the second assistant-enabled device. In these implementations, the operations may further include obtaining a respective volume level of audible content output from at least one of the first assistant-enabled device or the second assistant-enabled device. Here, determining the first assistant-enabled device satisfies the co-presence condition is further based on the respective volume level of the audible content output from at least one of the first assistant-enabled device or the second assistant-enabled device. Additionally or alternatively, obtaining proximity information for the second assistant-enabled device includes at least one of receiving an indication of a wireless communication signal transmitted from the second assistant-enabled device and captured by a sensor of the first assistant-enabled device, receiving connection data indicating the first assistant-enabled device is connected to the second assistant-enabled device, or receiving an indication that the first assistant-enabled device captured an audible or inaudible signal output from the second assistant-enabled device. In these implementations, the operations may further include, based on the proximity information for the second assistant-enabled device, determining that a proximity of the second assistant-enabled device relative to the first assistant-enabled device satisfies a proximity threshold. Here, determining the first assistant-enabled device satisfies the co-presence condition with the second assistant-enabled device is based on the determination that the proximity of the second assistant-enabled device relative to the first assistant-enabled device satisfies the proximity threshold.

In some examples, based on determining that the first assistant-enabled device satisfies the co-presence condition with the second assistant-enabled device and determining the second assistant-enabled device is performing the second long-standing operation that conflicts with the first long-standing operation, the operations further include suppressing performance of at least one of the first long-standing operation performed by the first assistant-enabled device or the second long-standing operation performed by the second assistant-enabled device for a threshold amount of time. After the threshold amount of time has lapsed, the operations also include determining that the first assistant-enabled device still satisfies the co-presence condition with the second assistant-enabled device. Here, executing the operation arbitration routine is based on determining that the first assistant-enabled device still satisfies the co-presence condition with the second assistant-enabled device after the threshold amount of time has lapsed.

In some implementations, the first long-standing operation performed by the first assistant-enabled device includes playback of media content from the first assistant-enabled device, and the second long-standing operation performed by the second assistant-enabled device includes playback of media content from the second assistant-enabled device. In these implementations, executing the operation arbitration routine includes identifying a first type of the media content played back from the first assistant-enabled device, identifying a second type of the media content played back from the second assistant-enabled device, and determining that the first type of the media content matches the second type of the media content. Based on determining that the first type of the media content matches the second type of the media content, the operations also include determining a third long-standing operation including one of the one or more identified compromise operations that merges the media content played back from the first and second assistant-enabled devices, and instructing the first assistant-enabled device or the second assistant-enabled device to perform the selected compromise operation includes instructing each of the first and second assistant-enabled devices to perform the third long-standing operation.

In some examples, executing the operation arbitration routine identifies one of the one or more compromise operations as performing one of the first long-standing operation or the second long-standing operation on the first assistant-enabled device and the second assistant-enabled device simultaneously, and instructing at least one of the first assistant-enabled device or the second assistant-enabled device to perform the selected compromise operation includes instructing the first and second assistant-enabled devices to perform the one of the first long-standing operation or the second long-standing operation simultaneously. In some implementations, executing the operation arbitration routine identifies one of the one or more compromise operations as adjusting respective media content playback settings of at least one of the first assistant-enabled device or the second assistant-enabled device, and instructing at least one of the first assistant-enabled device or the second assistant-enabled device to perform the selected compromise operation includes instructing at least one of the first assistant-enabled device or the second assistant-enabled device to adjust the respective media content playback settings. In some examples, executing the operation arbitration routine includes obtaining a capability of the first assistant-enabled device, obtaining a capability of the second assistant-enabled device, and identifying the one or more compromise operations for the at least one of the first assistant-enabled device or the second assistant-enabled device to perform based on the capability of the first assistant-enabled device and the second assistant-enabled device. Additionally or alternatively, executing the operation arbitration routine includes identifying a device type associated with the first assistant-enabled device, identifying a device type associated with the second assistant-enabled device, and identifying the one or more compromise operations for the at least one of the first assistant-enabled device or the second assistant-enabled device to perform based on the device type associated with the first assistant-enabled device and the device type associated with the second assistant-enabled device.

In some implementations, executing the operation arbitration routine includes identifying a user preference associated with the first assistant-enabled device, identifying a user preference associated with the second assistant-enable device, and identifying the one or more compromise operations for the at least one of the first assistant-enabled device or the second assistant-enabled device to perform based on the user preference associated with the first assistant-enabled device and the user preference associated with the second assistant-enabled device. In some examples, after executing the operation arbitration routine to identify the one or more compromise operations for the at least one of the first assistant-enabled device or the second assistant-enabled device to perform, the operations further include determining a respective score associated with each compromise operation among the one or more compromise operations, and selecting the compromise operation among the one or more compromise operations as the compromise operation having the highest respective score. In these examples, the operations may further include determining that the respective score associated with the selected compromise operation satisfies a threshold. Here, instructing the first assistant-enabled device and the second assistant-enabled device to perform the compromise operation is based on the respective score associated with the selected compromise operation satisfying the threshold.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

A user's manner of interacting with an assistant-enabled device is designed primarily, if not exclusively, by means of voice input. For example, a user may ask a device to perform an action including media playback (e.g., music or podcasts), where the device responds by initiating playback of audio that matches the user's criteria. In instances where an environment includes more than one device (e.g., a smart speaker), media playback from each of the devices in the environment may overlap and compete with one another. In these instances, long-standing media playback may start out in separate environments; however, due to the portable nature of individual smart speakers, the media playback may overlap if the devices in the environment are moved.

In scenarios where the media playback content from two or more devices conflict in the environment, a user will manually tune one of the devices to control the playback content from interfering with the other playback content. For example, a user may walk over to a smart speaker playing back music and lower/mute the volume so that it no longer interferes with an audiobook being played from a tablet. In other scenarios, a user may manually sync two smart speakers playing back conflicting music to play in a synchronized manner.

Implementations herein are directed toward detecting whenever two media playback devices are in close proximity while playing different media content at the same time. To eliminate the audio dissonance between the competing devices, an arbitration procedure is performed to determine which piece of media content should be played. For example, both media playback devices may be automatically paired to play one of the media content simultaneously. Alternatively, the device settings of one of the media playback devices may be adjusted so that the media playback devices may continue to play different media content without creating conflicting audio. Moreover, when the two devices are no longer in proximity, they may continue to perform according to the adjustment determined by the arbitration routine, or return to their original states. By automatically adapting the media content, users are saved the time and inconvenience of manually modifying media content each time a device moves.

Figure 1A:
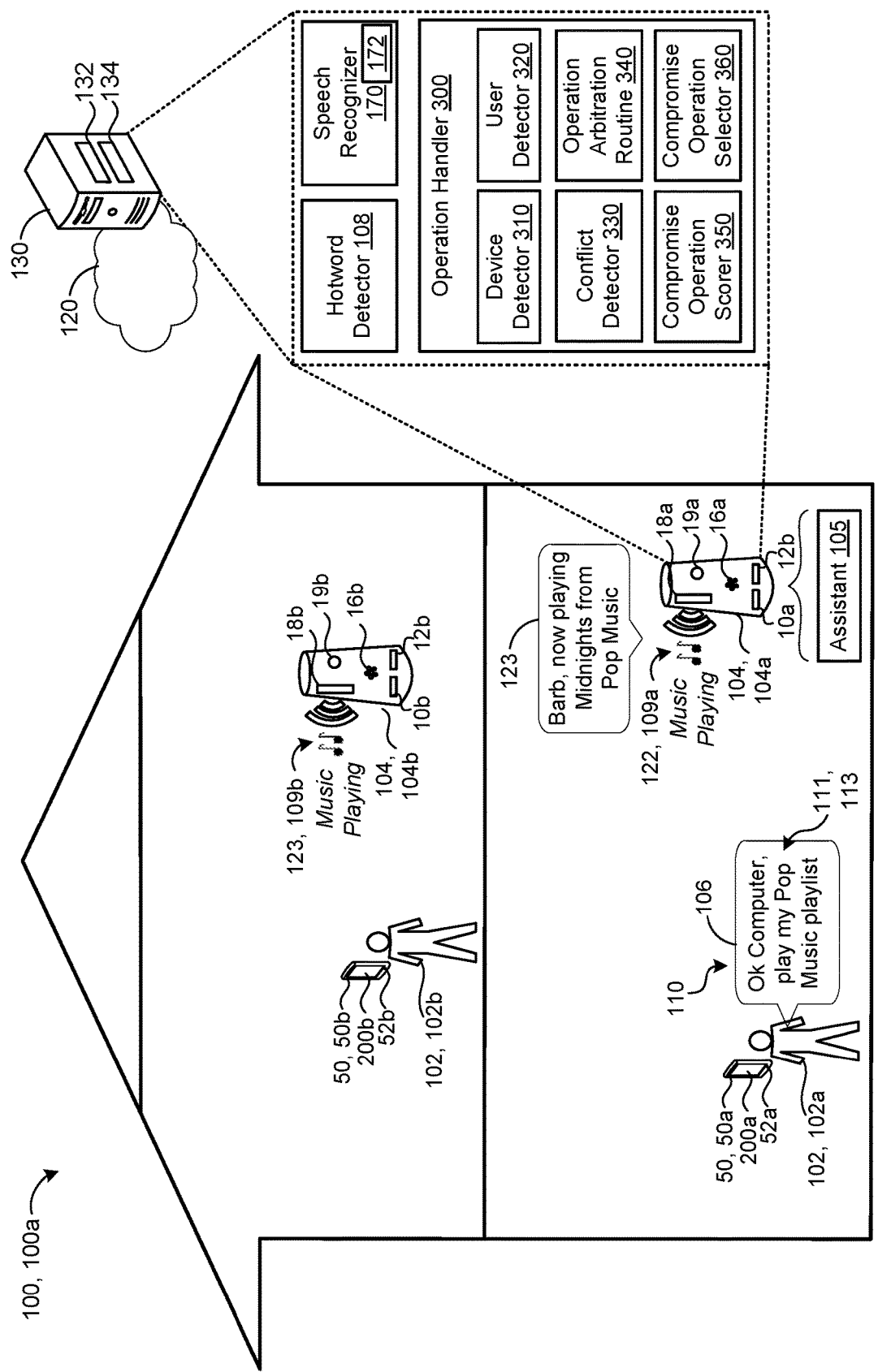
FIGS. 1A-1C are schematic views of an example system including media arbitration between two or more assistant-enabled devices.
Figure 1B:
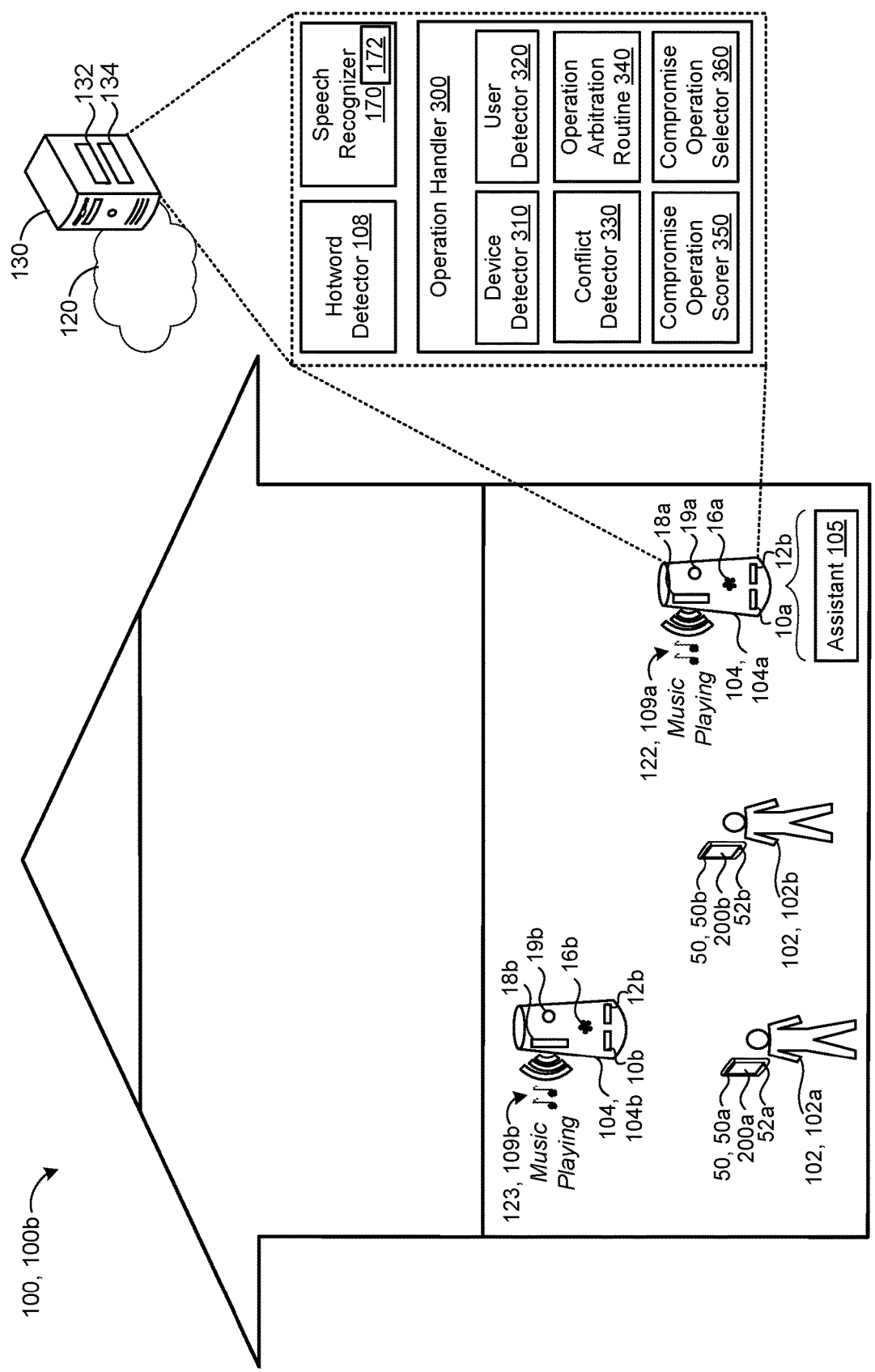
Figure 1C:
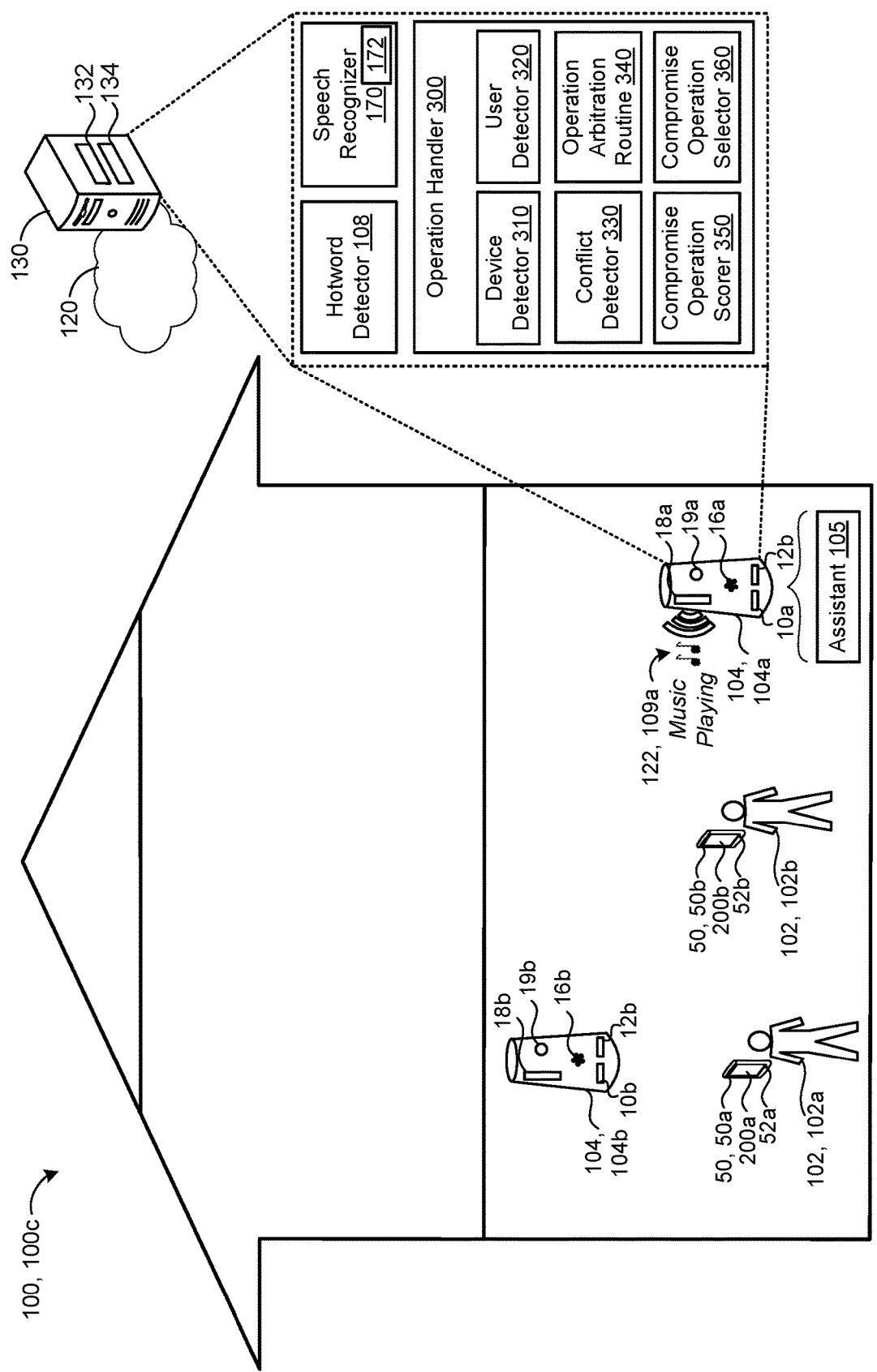

FIGS. 1A-1C illustrate example systems 100a-c for performing media arbitration in an environment with two or more assistant-enabled devices 104, 104a-n using an operation handler 300 that balances conflicting long-standing operations from the two assistant-enabled devices 104 by offering compromises. Briefly, and as described in more detail below, a digital assistant 105 including the operation handler 300 (FIG. 3) begins to play music 122 on a first assistant-enabled device 104a in response to receiving a first query 106, "Ok computer, play my Pop Music playlist," issued by a user 102a in the environment. While the first assistant-enabled device 104a is performing the long-standing operation 111 of playing the music 122 as playback audio from a speaker 18, the digital assistant 105 detects that the first assistant-enabled device 104a satisfies a co-presence condition with a second assistant-enabled device 104b that is performing a second long-standing operation 112 that conflicts with the first long-standing operation 111. Because the first long-standing operation 111 and the second long-standing operation 112 conflict, the operation handler 300 identifies one or more compromise operations 344, 344a-n (FIG. 3) for at least one of the first assistant-enable device 104a or the second assistant-enabled device 104b to perform.

Figure 3:
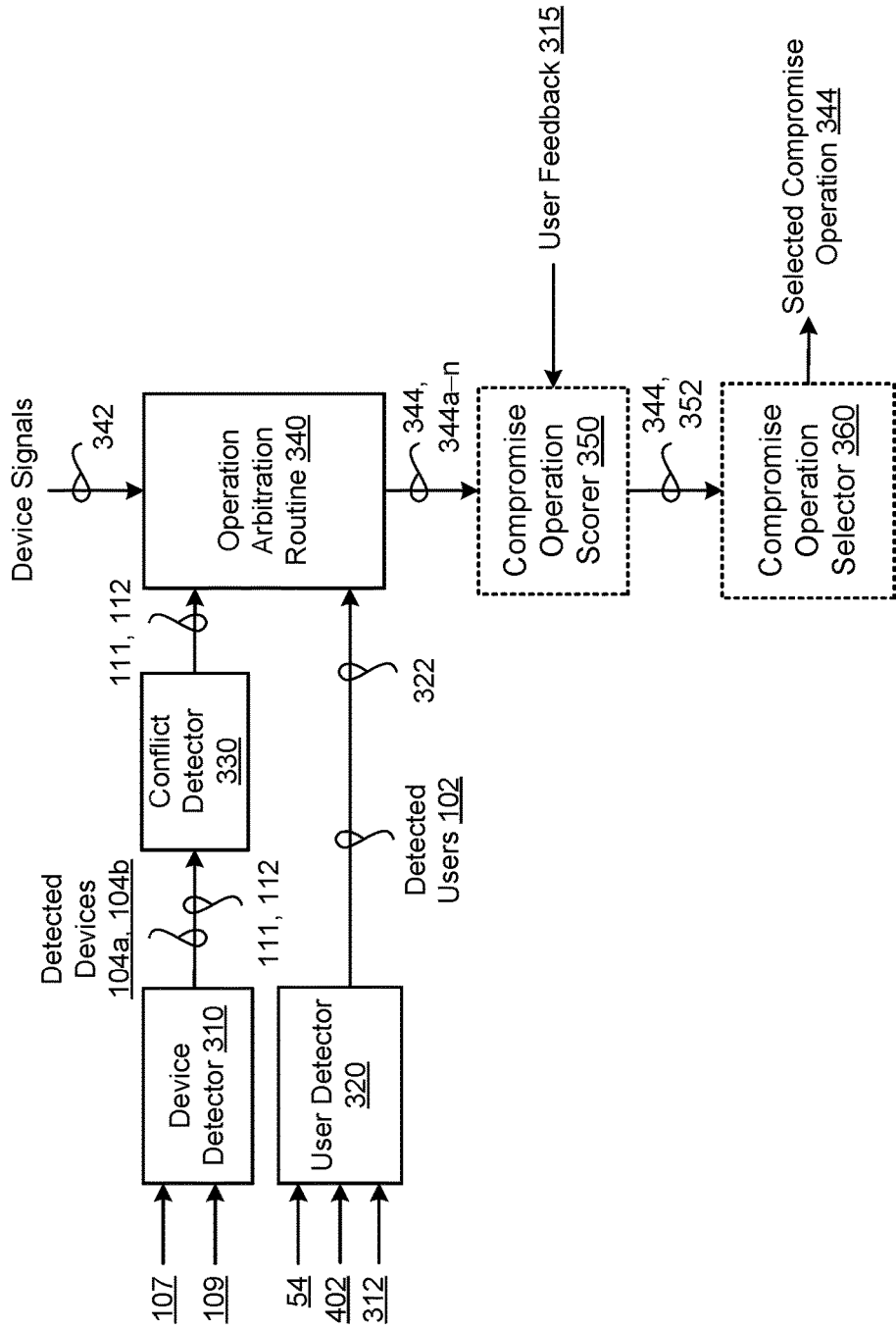
FIG. 3 is a schematic view of a compromise operation selector process.

The systems 100a-100c include two or more assistant-enable devices (AEDs) 104, 104a-n located throughout the environment. In the examples shown, the environment may include more than one user 102 and correspond to a home having a first floor and second floor, in which a first smart speaker 104 (i.e., first AED 104a) is located on the first floor, and a second smart speaker 104b (i.e., second AED 104b) is located on the second floor. However, the AEDs 104 can include other computing devices, such as, without limitation, a smart phone, tablet, smart display, desktop/laptop, smart watch, smart glasses/headset, smart appliance, headphones, or vehicle infotainment device. Each AED 104 includes respective data processing hardware 10 and memory hardware 12 storing instructions that when executed on the data processing hardware 10 cause the data processing hardware 10 to perform operations. In some examples, the AED 104 is configured to communicate with a remote system 130 via a network 120. The remote system 130 may include remote resources, such as remote data processing hardware 132 (e.g., remote servers or CPUs) and/or remote memory hardware 134 (e.g., remote databases or other storage hardware). As shown, the digital assistant 105 executes on the first AED 104a that users 102 in the environment may interact with by issuing queries including commands to perform a long standing-action. However, in some implementations, the digital assistant 105 executes on the second AED 104b and/or on the remote system 130 in communication with the AEDs 104. Each AED 104 includes an array of one or more microphones 16 configured to capture acoustic sounds such as speech directed toward the AED 104. The AED 104 may also include, or be in communication with, an audio output device (e.g., speaker) 18 that may output audio such as music 122 and/or synthesized speech from the digital assistant 105. Additionally, the AED 104 may include, or be in communication with, one or more cameras 19 configured to capture images within the environment and output image data 312 (FIG. 3).

In some configurations, the digital assistant 105 is in communication with multiple user devices 50, 50a-n associated with the users 102 in the environment. In the examples shown, each user device 50 of the multiple user devices 50a-c includes a smart phone that the respective user 102 may interact with. However, the user device 50 can include other computing devices, such as, without limitation, a smart watch, smart display, smart glasses, a smart phone, smart glasses/headset, tablet, smart appliance, headphones, a computing device, a smart speaker, or another assistant-enabled device. Each user device 50 of the multiple user devices 50a-n may include at least one microphone 52, 52a-n residing on the user device 50 that is in communication with the digital assistant 105. In these configurations, the user device 50 may also be in communication with the one or more microphones 16 residing on the respective AEDs 104. Additionally, the multiple users 102 may control and/or configure the AEDs 104, as well as interact with the digital assistant 105, using an interface 200, such as a graphical user interface (GUI) 200 (FIG. 2) rendered for display on a respective screen of each user device 50.

As shown in FIGS. 1A-1C and 3, the digital assistant 105 implements an operation handler 300 that detects and manages competing media output by multiple AEDs 104 using an operation arbitration routine 340. In some implementations, the operation handler 300 includes a device detector 310 that may continuously, or at least during periodic intervals, detect whether a co-presence condition between AEDs 104 within the environment is satisfied, and a user detector 320 that detects users 102 within the environment. A conflict detector 330 detects/identifies conflicts between long-standing operations being performed by the two or more AEDs 104 that satisfy a co-presence condition, while the operation arbitration routine 340 identifies one or compromise operations 344 for at least one of the AEDs 104 to perform. Optionally, the operation handler 300 includes a compromise operation scorer 350 configured to rank/score each of the one or more identified compromise operations 344, and a compromise operation selector 360 that receives the one or more identified compromise operations 344 and the associated confidence scores 352, and selects a compromise operation 344 for one or more of the AEDs 104 to perform. In this sense, the operation handler 300 actively detects events where audio dissonance may occur between two or more AEDs 104 in the environment and automatically balances the competing interests of the users 102 while minimizing unnecessary interruptions of the respective long-standing operations 111, 112 performed by the AEDs 104.

The device detector 310 detects the AEDs 104 in the environment and, based on the detected AEDs 104, determines whether the co-presence condition is satisfied. Because the number of AEDs 104, types of content output by the AEDs 104, and users 102 present in an environment may continuously change, the device detector 310 may consider multiple dynamic factors when determining whether the co-presence condition is satisfied. In some implementations, each AED 104 broadcasts proximity information 107, 107a-n receivable by the device detector 310 (FIG. 3) that the digital assistant 105 executing on the first AED 104a may use to determine the co-presence of other AEDs 104 in the environment. For instance, determining that the first AED 104a satisfies the co-presence condition with the second AED 104b may be based on the obtained proximity information 107a of the second AED 104b. The digital assistant 105 may additionally use the proximity information 107 of each AED 104 to infer a home graph to understand the spatial proximity of each AED 104 relative to one another and relative to the AED 104a executing the digital assistant 105 for determining whether the co-presence condition is satisfied.

In some examples, the digital assistant 105 receives, at a sensor of the device detector 310 of the first AED 104a, an indication of a wireless communication signal transmitted by the second AED 104b and determines the proximity information 107b of the second AED 104b based on a signal strength of the wireless communication signal received at the sensor of the first AED 104a. Here, the wireless communication signal may include, without limitation, a Bluetooth signal, an infrared signal, a NFC signal, or an ultrasonic signal. In other examples, the device detector 310 receives the proximity information 107 from an access point (not shown) that indicates a signal strength of a wireless communication signal received at the access point from the AED 104. In these examples, the device detector 310 may determine a proximity score indicating the proximity estimation based on the signal strength of wireless communication signals received at the access point from the AED 104. In other examples, the device detector 310 receives connection data indicating the first AED 104a is connected to the second AED 104b and determines the proximity information 107 of the AED 104b based on the received connection data between the first AE 104a and the second AED 104b. Here, the connection data may include, without limitation, a software connection, a common application executing on both of the AEDs 104a, 104b, and/or a common connection to the remote server 130. In additional examples, the device detector 310 receives an indication that the first AED 104a captured (e.g., via the microphones 18) an audible or inaudible signal output from the second AED 104b and determines the proximity information 107 for the second AED 104b based on an energy and/or frequency of the audible or inaudible signal output from the second AED 104b.

In some examples, the device detector 310 detects the AEDs 104 as satisfying the co-presence condition when the proximity information 107b of the AED 104b relative to the AED 104a satisfies a proximity threshold. Here, the proximity distance threshold may be configurable and be associated with a distance between the first AED 104a and the second AED 104b to indicate that it is likely that the AEDs 104 are in close proximity to one another. In this way, an AED 104 separated from the first AED 104a by a distance that does not meet the proximity threshold (e.g., far away) can be effectively filtered out by the device detector 310 as not satisfying the co-presence condition. For example, when the first AED 104a is on a first floor, one or more AEDs 104 located on a second floor may not be considered as satisfying the co-presence threshold by the device detector 310.

In addition to the proximity information 107, the device detector 310 may obtain a respective volume level of audible content 109 output from at least one of the first AED 104a or the second AED 104b when determining whether the co-presence condition is satisfied. Here, the device detector 310 determines that the first AED 104a satisfies the co-presence based on the respective volume level of the audible content 109 output from at least one of the first AED 104a or the second AED 104b. In some examples, the device detector 310 dynamically adjusts whether the co-presence condition is satisfied using a combination of the respective volume levels of the audible content 109 output by the AEDs 104 in addition to the proximity information 107 of the AEDs 104. For instance, when the proximity information 107 for the second AED 104b indicates that the first AED 104a and the second AED 104b are in close proximity to one another, the device detector 310 may detect that the co-presence condition is satisfied even when the audible content 109 output of either the first AED 104a or the second AED 104b exceeds a low volume level. Conversely, when the proximity information for the second AED 104b indicates that the first AED 104a and the second AED 104b are not in close proximity to one another (e.g., on opposite sides of a large room), the device detector 310 may only detect that the co-presence condition is satisfied if the audible content 109 output of either the first AED 104a or the second AED 104b reaches a higher volume level. Similarly, the device detector 310 may consider the type of content output from each of the first AED 104a and the second AED 104b to when determining a sensitivity to whether the co-presence condition is satisfied. For example, if device detector 310 detects that the first AED 104a outputs sports content (e.g., a baseball game) and the second AED 104b outputs a movie (e.g., a kids movie), the device detector 310 may determine that the co-presence condition is not satisfied and allow the first AED 104a to continue outputting the sports content at the same time the second AED 104b outputs the movie.

In some implementations, each user device 50a-c of the users 102 broadcasts proximity information 54 receivable by the user detector 320 that the operation handler 300 may use during execution of the operation arbitration routine 340 to balance preferences of the users 102 when determining changes to the media output by the AEDs 104. The proximity information 54 from each user device 50 may include wireless communication signals, such as WiFi, Bluetooth, or Ultrasonic, in which the signal strength of the wireless communication signals received by the user detector 320 may correlate proximities (e.g. distances) of the user device 50 relative to the AEDs 104 detected in the environment by the device detector 310.

In implementations where a user 102 does not have a user device 50, or has a user device 50 that does not share proximity information 54, the user detector 320 may detect the users 102 based on an explicit input (e.g., a guest list) received from a host user 102 (e.g., user 102a). For example, the user detector 320 receives a guest list from the host user 102 (e.g., user 102a) indicating the identities of each user 102 in the environment. Alternatively, the user detector 320 detects one or more of the users 102 by performing speaker identification on utterances corresponding to audio data 402 detected within the environment. In other implementations, the user detector 320 detects the users 102 in the environment by receiving image data 312 corresponding to a scene of the environment and obtained by the camera 19. Here, the user detector 320 detects the users 102 based on the received image data 312.

Referring to FIG. 1A, the user 102*a* is shown on the first floor issuing a query 106, "Ok computer, play my Pop Music playlist" in the vicinity of the first AED 104*a*. Here, the query 106 issued by the user 102*a* is spoken by the user 102*a* and includes audio data 402 (FIG. 3) corresponding to the query 106. The query 106 may further include a user input indication indicating a user intent to issue the first query, via any one of touch, speech, gesture, gaze, and/or an input device (e.g., mouse or stylus) for interacting with the first AED 104*a*. Optionally, based on receiving the audio data 402 corresponding to the query 106, the query handler 300 resolves the identity of the speaker of the query 106 by performing a speaker identification process (not shown) on the audio data 402 and determining that the query 106 was issued by the user 102*a*. In other implementations, the user 102*a* issues the query 106 without speaking. In these implementations, the user 102*a* may issue the query 106 via a user device 50*a* associated with the user 102*a* (e.g., entering text corresponding to the query 106 into the GUI 200 displayed on the screen of the user device 50*a* associated with the user 102*a*, selecting the query 106 displayed on the screen of the user device 50*a*, etc.). Here, the first AED 104*a* may resolve the identity of the user 102 that issued the query 106 by recognizing the user device 50*a* associated with the user 102*a*.

The microphone 16 of the first AED 104*a* receives the query 106 and processes the audio data 402 that corresponds to the query 106. The initial processing of the audio data 402 may involve filtering the audio data 402 and converting the audio data 402 from an analog signal to a digital signal. As the first AED 104*a* processes the audio data 402, the AED may store the audio data 402 in a buffer of the memory hardware 12 for additional processing. With the audio data 402 in the buffer, the first AED 104*a* may use a hotword detector 108 to detect whether the audio data 402 includes the hotword. The hotword detector 108 is configured to identify hotwords that are included in the audio data 402 without performing speech recognition on the audio data 402.

In some implementations, the hotword detector 108 is configured to identify hotwords that are in the initial portion of the query 106. In this example, the hotword detector 108 may determine that the query 106 "Ok computer, play my Pop Music playlist" includes the hotword 110 "ok computer" if the hotword detector 108 detects acoustic features in the audio data 402 that are characteristic of the hotword 110. The acoustic features may be mel-frequency cepstral coefficients (MFCCs) that are representations of short-term power spectrums of the query 106 or may be mel-scale filterbank energies for the query 106. For example, the hotword detector 108 may detect that the query 106 "Ok computer, play my Pop Music playlist" includes the hotword 110 "ok computer" based on generating MFCCs from the audio data 402 and classifying that the MFCCs include MFCCs that are similar to MFCCs that are characteristic of the hotword "ok computer" as stored in a hotword model of the hotword detector 108. As another example, the hotword detector 108 may detect that the query 106 "Ok computer, play my Pop Music playlist" includes the hotword 110 "ok computer" based on generating mel-scale filterbank energies from the audio data 402 and classifying that the mel-scale filterbank energies include mel-scale filterbank energies that are similar to mel-scale filterbank energies that are characteristic of the hotword "ok computer" as stored in the hotword model of the hotword detector 108.

When the hotword detector 108 determines that the audio data 402 that corresponds to the query 106 includes the hotword 110, the first AED 104*a* may trigger a wake-up process to initiate speech recognition on the audio data 402 that corresponds to the query 106. For example, the first AED 104*a* including a speech recognizer 170 employing an automatic speech recognition model 172 that may perform speech recognition or semantic interpretation on the audio data 402 that corresponds to the query 106. The speech recognizer 170 may perform speech recognition on the portion of the audio data 402 that follows the hotword 110. In this example, the speech recognizer 170 may identify the words "play my Pop Music playlist" in the query 106.

In some examples, the digital assistant 105 executes on the remote server 130 in addition to, or in lieu of the first AED 104*a*. The first AED 104*a* may utilize the remote server 130 to perform various functionality related to speech processing and/or synthesized playback communication. In some implementations, the speech recognizer 170 is located on the remote server 130 in addition to, or in lieu, of the first AED 104*a*. Upon the hotword detector 108 triggering the first AED 104*a* to wake-up responsive to detecting the hotword 110 in the query 106, the AED 104 may transmit the audio data 402 corresponding to the query 106 to the remote server 130 via the network 120. Here, the first AED 104*a* may transmit the portion of the audio data 402 that includes the hotword 110 for the remote server 130 to confirm the presence of the hotword 110. Alternatively, the first AED 104*a* may transmit only the portion of the audio data 402 that corresponds to the portion of the query 106 after the hotword 110 to the remote server 130, where the remote server 130 executes the speech recognizer 170 to perform speech recognition and returns a transcription of the audio data 402 to the first AED 104*a*.

With continued reference to FIG. 1A, the digital assistant 105 may further include a natural language understanding (NLU) module (not shown) that performs semantic interpretation on the query 106 to identify the query/command directed toward the first AED 104*a*. Specifically, the NLU module identifies the words in the query 106 identified by the speech recognizer 170, and performs semantic interpretation to identify any speech commands in the query 106. The NLU module of the first AED 104*a* (and/or the remote server 130) may identify the word "play my Pop Music playlist" as a command specifying a first long-standing operation 111 (i.e., play music 122) for the digital assistant 105 to perform. In the example shown in FIG. 1A, the digital assistant 105 begins to perform the first long-standing operation 111 of playing music 122 as playback audible content 109*a* output from the speaker 18*a* of the first AED 104*a*. The digital assistant 105 may stream the music 122 from a streaming service (not shown) or the digital assistant 105 may instruct the first AED 104*a* to play music stored on the first AED 104*a*. While the example long-standing operation 111 includes music playback, the long-standing operation may include other types of media playback, such as video, podcasts, and/or audio books.

Figure 2:
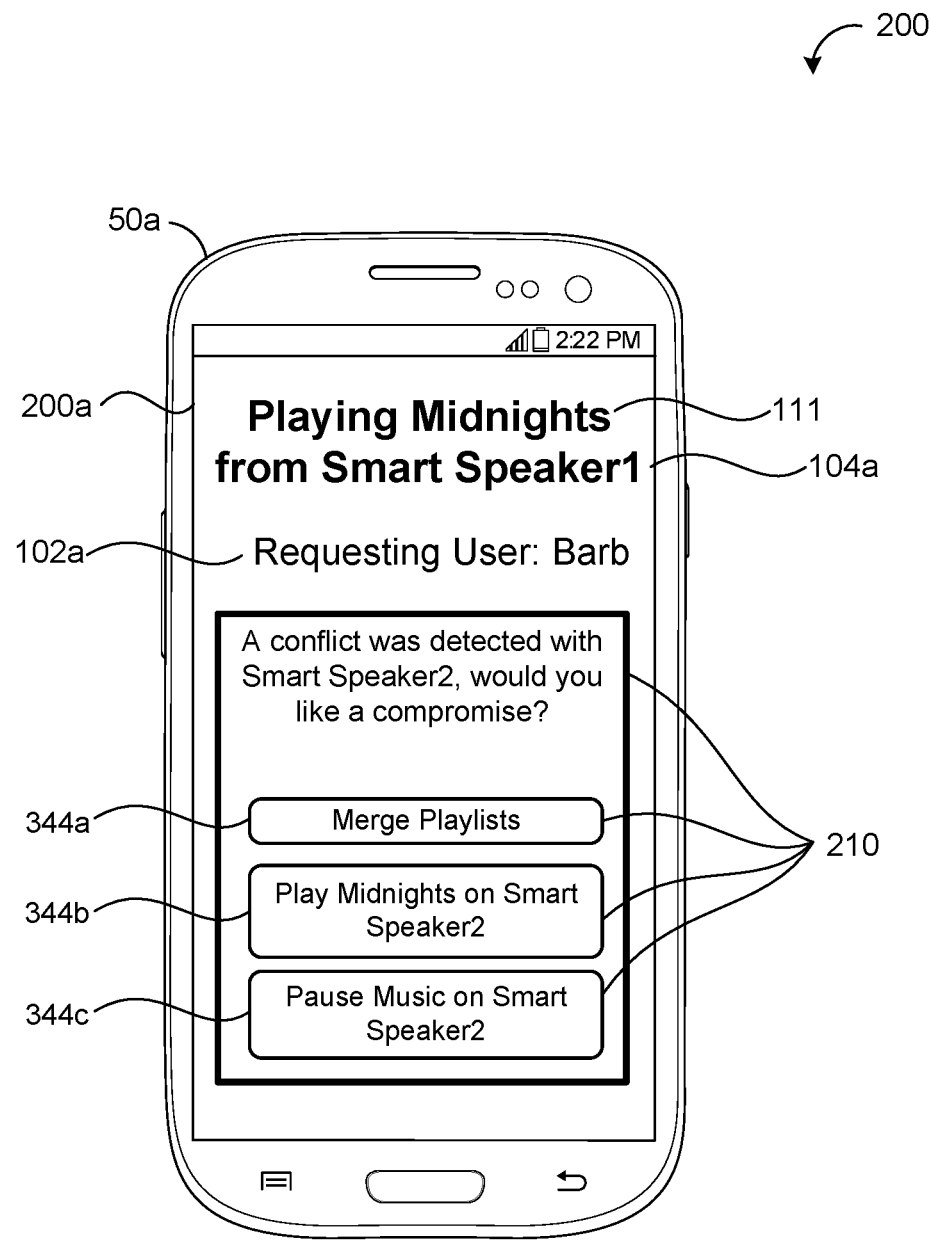
FIG. 2 is an example graphical user interface rendered on a screen of a user device to display a long-standing operation.

The first AED 104*a* may notify the user 102*a* (e.g., Barb) that issued the query 106 that the first long-standing operation 111 is being performed. For instance, the digital assistant 105 may generate synthesized speech 123 for audible output from the speaker 18*a* of the first AED 104*a* that states, "Barb, now playing Midnights". In additional examples, the digital assistant 105 provides a notification to the user device 50*a* associated with the user 102*a* (e.g., Barb) to inform the user 102*a* of the first long-standing operation 111 being performed. Referring to FIG. 2 the GUI 200*a* of a user device 50*a* associated with the user 102*a* may allow the user 102*a* to control the performance of long-standing operations within the environment being performed by the digital assistant 105. In some configurations, the first AED 104*a* includes a screen and renders the GUI 200*a* for displaying the active long-standing operations thereon. For instance, the first AED 104*a* may include a smart display, tablet, or smart tv within the environment. Here, the example GUI 200*a* is displayed on a screen of the user device 50*a* associated with the user 102*a* that additionally may render for display an identifier of the first long-standing operation 111 (e.g., "Playing Midnights"), an identifier of the AED 104 (e.g., Smart Speaker1) that is currently performing the first long-standing operation 111, and/or an identity of the user 102*a* (e.g., Barb) that initiated the first long-standing operation 111 being performed by the first AED 104*a*. In some implementations, the operation handler 300 manages conflicting long-standing operations detected within the environment by may soliciting input from the user 102*a* (i.e. via the GUI 200*a*).

Referring to the example shown in FIG. 1A, while the first AED 104*a* performs the first long-standing operation 111 on the first floor, the user 102*b* is shown on the second floor in the vicinity of the second AED 104*b*. Here, the second AED 104*b* is performing a second long-standing operation 112 of playing music 123 as playback audible content 109*b* as output from the speaker 18*a* of the second AED 104*b*. The device detector 310 may identify the first AED 104*a* (i.e., the AED 104 executing the digital assistant 105) and the second AED 104*b* via the proximity information 107 and/or the audible content 109 received from each of the AEDs 104 and determine that the first AED 104*a* does not satisfy the co-presence condition with the second AED 104*b*. For instance, the proximity information 107 received from the second AED 104*b* may indicate that the second AED 104*b* is on the second floor, while the first AED 104*a* is on the first floor, such that the audible content 109*b* output by the second AED 104*b* does not conflict with the audible content 109*a* output by the first AED 104*a*. In other implementations, because the second AED 104*b* is on a different floor than the first AED 104*a*, the audible content 109*b* output by the second AED 104*b* may not be detected by the digital assistant 105 (i.e., via the device detector 310) executing on the first AED 104*a*. Here, because the device detector 310 does not obtain/detect the audible content 109*b*, the device detector 310 determines that the first AED 104*a* does not satisfy the co-presence condition with the second AED 104*b*. Because the AEDs 104*a*, 104*b* are not in the same vicinity (i.e., the co-presence condition is not satisfied), the operation handler 300 does not execute the operation arbitration routine 340 to avoid conflict between the first long-standing operation 111 and the second long-standing operation 112. In other words, the digital assistant 105 may proceed with performing the first long-standing operation 111 without first determining whether the first long-standing operation 111 and the second long-standing operation 112 conflict.

Referring to FIGS. 1B and 3, the user 102*b* and the second AED 104*b* have moved to the first floor. Here, the second AED 104*b* includes a portable AED (e.g., a smart speaker) that the user 102*b* carries from the second floor to the first floor. As shown, the second AED 104*b* is performing the second long-standing operation 112 of playing music 123 as audible output 109*b* at the same time that the first AED 104*a* is performing the first long-standing operation 111 of play-ing music 122 as audible output 109*a*. As discussed above with reference to FIG. 3, the device detector 310 may continuously (or at periodic intervals) obtain proximity information 107 and/or audible content 109 for each of the AEDs 104 in the environment to determine whether the co-presence condition is satisfied. As shown in FIG. 1B, the device detector 310 obtains the proximity information 107*b* (i.e., indicating that the second AED 104*b* is in close proximity to the first AED 104*a*), and the audible output 109*b* (i.e., indicating that the audible output 109*b* would overlap with the audible output 109*a*) output by the second AED 104*b* and determines that the first AED 104*a* satisfies the co-presence condition with the second AED 104*b*.

Based on the device detector 310 determination that the first AED 104*a* satisfies the co-presence condition with the second AED 104*b*, the operation handler 300 determines whether the first long-standing operation 111 conflicts with the second long-standing operation 112. In other words, because the AEDs 104*a*, 104*b* are both present in the same environment, and accordingly are more likely to conflict, the conflict detector 330 determines whether the second long-standing operation 112 performed by the second AED 104*b* conflicts with the first long-standing operation 111 performed by the first AED 104*a*. For example, the conflict detector 330 may determine whether the first long-standing operation 111 and the second long-standing operation 112 include respective audible outputs 109 at volume levels that would overlap/conflict. Additionally or alternatively, the conflict detector 330 determines whether the first long-standing operation 111 and the second long-standing operation 112 invoke the same media playback functions (e.g., playing music) or different functions (e.g., playing music and playing a movie). In examples where the first long-standing operation 111 and the second long-standing operation 112 conflict, the conflict detector 330 outputs the conflicting long-standing operations 111, 112 for the operation arbitration routine 340 to identify one or more compromise operations 344 for the AEDs 104*a*, 104*b*.

In some examples, the conflict detector 330 only outputs the first long-standing operation 111 and the second long-standing operation 112 (thereby triggering the operation arbitration routine 340 to execute to identify one or more compromise operations 344) when it determines that the second long-standing operation 112 conflicts with the first long-standing operation 111. Conversely, where the first long-standing operation 111 and the second long-standing operation 112 invoke different functions, the conflict detector 330 determines that the second long-standing operation 112 does not conflict with the first long-standing operation 111. For example, when the first long-standing operation 111 is playing music and the second long-standing operation 112 is playing a sporting event (e.g., a hockey game), the conflict detector 330 may determine that no conflict exists between the long-standing operations 111, 112. Put another way, the conflict detector 330 only outputs the long-standing operations 111, 112, thereby prompting the operation arbitration routine 340 to identify one or more compromise operations 344 when a conflict exists representing competing audio between the first AED 104*a* and the second AED 104*b*.

In the example, the conflict detector 330 determines that the second long-standing operation 112 of playing music 123 conflicts with the first long-standing operation 111 of playing music 122, as performing the second long-standing operation 112 via the speaker 18*b* of the second AED 104*b* necessarily interferes with the audible output 109*a* of the first long-standing operation playing music 122 via speaker 18*a* of the first AED 104*a* while the AEDs 104 are in close proximity (i.e., in the same room) to one another. Optionally, based on determining that the first AED 104*a* and the second AED 104*b* satisfy the co-presence condition and that the long-standing operations 111, 112 conflict, the operation handler 300 suppresses performance of at least one of the first long-standing operation 111 performed by the first AED 104*a* or the second long-standing operation 112 performed by the second AED 104*b* for a threshold amount of time. Here, the operation handler 300 executes the operation arbitration routine 340 based on determining that the first AED 104*a* still satisfies the co-presence condition with the second AED 104*b* after the threshold amount of time has lapsed. For instance, the operation handler 300 may be configured with a change threshold and, when the detected AEDs 104 satisfies the co-presence condition for the change threshold (e.g., exceeds the threshold), operation handler 300 executes the operation arbitration routine 340. The threshold may be zero, where the slightest difference (e.g., as soon as an AED 104 enters or exits the environment of another AED 104) detected in the environment by the device detector 310 may trigger the execution of the operation arbitration routine 340. Conversely, the threshold may be higher than zero to prevent unnecessary adjustments/ changes to the long-standing operations 111, 112 as a type of interruption sensitivity mechanism. For example, the change threshold may be temporal (e.g., an amount of time), where the operation handler 300 does not identify one or more compromise operations 344 if an AED 104 has temporarily entered the environment of another AED 104, but exits the environment (e.g., goes to a different room) within a threshold amount of time.

Referring back to FIG. 3, in some implementations, the operation arbitration routine 340 executes an arbitration model that uses one or more approaches to generate the one or more compromise operations 344, 344*a-n* for at least one of the first AED 104*a* and the second AED 104*b* to perform. For example, the operation arbitration routine 340 may be configured to receive the first long-standing operation 111 and the second long-standing operation 112 as input and generate, as output, one or more compromise operations 344 that combine the first long-standing operation 111 and the second long-standing operation 112. For example, if the first long-standing operation 111 is playing music 122 (e.g., Pop Music) and the second long-standing operation 112 is playing music 123 of the same genre (e.g., Pop Music), the operation arbitration routine 340 may output a compromise operation 344 to play one of the first long-standing operation 111 or the second long-standing operation 112 on each of the AEDs 104 simultaneously. Here, the digital assistant 105 may instruct at least one of the first AED 104*a* or the second AED 104*b* to perform the output compromise 344 by instructing the first AED 104*a* and second AED 104*b* to perform the one of the first long-standing operation 111 or the second long-standing operation 112 simultaneously. In other words, the digital assistant 105 may instruct one or both of the AEDs 104 to perform the first long-standing operation simultaneously 111, or instruct one or both of the AEDs 104 to perform the second long-standing operation 112 simultaneously.

In addition to instructing one of the AEDs 104 to switch performance of its long-standing operation to the other of the long-standing operations 111, 112, the output compromise operation 344 may include adjusting the respective media content playback settings of at least one of the first AED 104*a* or the second AED 104*b*. The media content playback settings may include, without limitation, volume, mute, stereo mode, etc. Here, the compromise operation 344 may include instructions to at least one of the AEDs 104 to adjust their respective media content playback settings. For instance, the compromise operation 344 may group the AEDs 104 by instructing the AEDs 104 to play in stereo mode. In other examples, rather than instructing one of the AEDs 104 to switch its performance, where the first long-standing operation 111 includes playing music 122, and the second long-standing operation 112 includes playing a sporting event, the operation arbitration routine 340 identifies a compromise operation 344 as adjusting the media content playback settings of the second AED 104*b* to mute the sporting event. Here, by adjusting the volume of a sporting event that can be observed visually, both of the long-standing operations 111, 112 may continue to be performed without further conflict.

The arbitration model of the operation arbitration routine 340 may be a neural network model trained under machine or human supervision to output compromise operations 344. In other implementations, the operation arbitration routine 340 includes a plurality of arbitration models (e.g., some arbitration models that comprise a neural network, some arbitration models that do not comprise a neural network). In these implementations, the operation arbitration routine 340 may select which arbitration model of the plurality of arbitration models to use as the arbitration model based on the category of actions the long-standing operations 111, 112 are associated with.

In some examples, the first long-standing operation 111 performed by the first AED 104*a* includes playback of media content from the first AED 104*a*, and the second long-standing operation 112 performed by the second AED 104*a* includes playback of media content from the second AED 104*b*. In these examples, executing the operation arbitration routine 340 includes identifying a first type of the media content played back from the first AED 104*a* and a second type of the media content played back from the second AED 104*b*. In this example, the first type of media content played back from the first AED 104*a* includes a pop music playlist, and the second type of media content played back from the second AED 104*b* also includes pop music. Here, the operation arbitration routine 340 determines that the first type of media content matches the second type of media content and determines a third long-standing operation that merges the first type of media content played back from the first AED 104*a* and the second type of media content played back from the second AED 104*b* and generates the third long-standing operation as one of the one or more compromise operations 344. In other words, because the types of media content match, the operation arbitration routine 340 may concatenate/interleave the first type of media content with the second type of media content to generate the third long-standing operation, where the operation handler 300 instructs one or both of the first AED 104*a* and the second AED 104*b* to perform the third long-standing operation.

In some implementations, in addition to receiving the long-standing operations 111, 112, the operation arbitration routine 340 receives information about the AEDs 104 and the environment of the AEDs 104 when identifying the one or more compromise operations 344. For example, the operation arbitration routine 340 obtains device signals 342 from each of the AEDs 104, where one or more of the compromise operations 344 identified by the operation arbitration routine 340 are based on the obtained device signals 342. The obtained device signals 342 for each respective AED 104 may include, without limitation, a capability of the AED 104, a device type of the AED 104, and/or an operation context of the AED 104. The capability of the AED 104 may include whether the AED 104 includes a microphone 16, speaker 18, and/or screen for playing complimentary content to one of the compromise operations 344. The type of device of the AED 104 may refer to whether the AED 104 is fixed or portable. Here, the operation arbitration routine 340 may give greater weight to maintaining the long-standing operation of a fixed device AED 104 rather than a portable AED 104 that can be easily removed from the environment. The operation context of the AED 104 may indicate how recently the long-standing operation was initiated on the associated AED 104. For example, the operation arbitration routine 340 may deem that an AED 104 that has been performing its respective long-standing operation for a longer period of time has greater importance than an AED 104 that only recently initiated a long-standing operation.

As discussed above with respect to FIGS. 1A and 3, the user detector 320 may detect the users 102 in the environment via audio data 402, image data 312, and/or proximity information 54 broadcast by the corresponding user device 50 of the user 102. The operation arbitration routine 340 may receive a list of the users 102 including any user preferences 322 associated with each AED 104. Here, the operation arbitration routine 340 identifies the one or more compromise operations 344 based on the user preferences 322 associated with each AED 104. For example, the list of users 102 generated by the user detector 320 may include a registered user 102 of the AEDs 104a, 104b and one or more guest users 102. Here, the registered user 102 may include a user preference 322 that the registered user 102 prefers to use the first AED 104a when available. When the operation arbitration routine 340 obtains the list of users 102 including the user preferences 322, the operation arbitration routine 340 may identify a compromise operation 344 to instruct the first AED 104a to perform a long-standing operation and the AED 104b to end the performance of any existing long-standing operation. In these examples, the user detector 320 may generate the list of users 102 in the environment and include a unique identifier (e.g., a device identifier based on proximity information 54, speaker identification based on the audio data 402, and/or facial recognition based on the image data 312) of each user 102 in the list of users 102. Alternatively, the user detector 320 may generate the list of users 102 in the environment without uniquely identifying the users (i.e., identifying a number of users).

Referring to FIG. 3, after the operation arbitration routine 340 identifies the one or more compromise operations 344, a compromise operation scorer 350 may determine a respective confidence score 352 associated with each compromise operation 344 among the multiple compromise operations 344. The compromise operation scorer 350 may be a heuristically-based model or a trained machine learning model. The compromise operation scorer 350 may output the one or more compromise operations 344 and each respective confidence score 352 to a compromise operation selector 360 that selects the compromise operation 344 among the multiple compromise operations 344 as the compromise operation 344 having the highest respective confidence score 352. In some implementations, the compromise operation selector 360 is configured with a score threshold and only selects a compromise operation 344 when at least one of the respective confidence scores 352 satisfies the score threshold (e.g., exceeds the threshold). The threshold may be zero, where any one of the identified compromise solutions 344 (e.g., even undesirable compromises) may be implemented in the first AED 104a or the second AED 104b. Conversely, the threshold may be higher than zero to avoid unnecessary compromise solutions 344 that are likely to be rejected by the users 102 in the environment. In other words, when the compromise operation scorer 350 identifies multiple compromise solutions/operations 344 each with a respective confidence score 352, the compromise operation selector 360 may automatically select the compromise operation 344 having the highest respective confidence score 352 and/or to perform.

In some implementations, when the compromise operation scorer 350 includes the trained machine learning model, the compromise operation scorer 350 is re-trained/tuned to adaptively learn to adjust the compromise operations 344 for particular AEDs 104 and/or users 102 based on user feedback 315 received after the compromise operation selector 360 selects the compromise operation 344 to perform and the operation handler 300 instructs the first AED 104a or the second AED 104b to perform the selected compromise operation 344. Here, the user feedback 315 may indicate acceptance of the selected compromise operation 344 or a subsequent manual adjustment to the content playback settings of the AEDs 104 via manual controls. For example, if no adjustment was made to the playback settings or the audible level was merely lowered, user feedback 315 indicating a subsequent manual adjustment of lowering the audible level further or pausing the playback of the media content altogether may indicate that the selected compromise operation 344 was less useful to the users 102 than the associated confidence score 352 indicated. As another example, acceptance of the adjusted content playback settings may be inferred by no subsequent manual adjustment to the content playback settings. The AED 104 may execute a training process that retrains the machine learning model compromise operation scorer 350 on the obtained compromise operations 344, the associated confidence score 352, the adjusted playback settings, and the obtained user feedback 315 so that the compromise operation scorer 350 adaptively learns to output confidence scores 352 personalized for the users 102 in the environment based on past user behavior/reaction in similar contexts.

Referring to FIG. 2, in some implementations, the digital assistant 105 may additionally provide a notification to the user device 50 associated with a user 102 to display user-selectable options for the one or more compromise solutions 344 as a graphical element 210 on the screen of the user device 50, the graphical element 210 prompting the user 102 to provide confirmation for the first AED 104a or the second AED 104b to perform the compromise operation 344. As shown, the GUI 200a renders, for display, the graphical elements 210 "A conflict was detected with Smart Speaker2, would you like a compromise?", "Merge Playlists" (i.e., compromise operation 344a) "Play Midnights on Smart Speaker2" (i.e., compromise operation 344b), and "Pause Music on Smart Speaker2" (i.e., compromise operation 344c) that allow the respective user 102 of the device to instruct (or opt out from the opportunity to instruct) the first AED 104a or the second AED 104b to perform the compromise operation 344. Here, the operation handler 300 receives positive confirmation from the user 102a for the digital assistant 105 to perform the compromise operation 344c when the user device 50a receives a user input indication indicating selection of the user selectable option selecting the graphical element 210 "Pause Music on Smart Speaker2." In response to receiving the positive confirmation from the user 102a, the digital assistant 105 instructs the second AED 104b to cease performance of the second long-standing operation 112, while allowing the first AED 104a to continue performance of the first long-standing operation 111. Additionally or alternatively to prompting the users 102 via the user device 50, the operation handler 300 may prompt the users via an audible output reciting the identified compromise operations 344.

Referring to FIG. 1C, the operation handler 300 (via the digital assistant 105) instructs the first AED 104a to continue performance of the first long-standing operation 111 and the second AED 104b to cease performance of the second long-standing operation 112. As shown, when performance of the second long-standing operation 112 is ended, the corresponding audible output 109b is ended as well. In some examples, after instructing the first AED 104a and the second AED 104b to perform the selected compromise operation 344, the device detector 310 may continually (or periodically) detect AEDs 104 in the environment. Here, each time an AED 104 enters or exits the environment, the operation handler 300 may execute the operation arbitration routine 340 to reconfigure the audio playback in the environment. For instance, when an AED 104 exits the environment, the operation hander 300 executes the operation arbitration routine 340, and instructs the AEDs 104 to return to their original long-standing operations.

While the examples primarily refer to avoiding the conflict in audio playback between two or more AEDs 104 that are performing the long-standing operation of playing music, the long-standing operations may refer to any category of playback content including, but not limited to, podcasts, videos, etc. Additionally, the operation handler 300 may perform arbitration in scenarios where audio playback is only being output by a single device. For example, when a portable AED 104 is approaching a group of users 102 having a conversation, the operation handler 300 may detect the group of users 102 and adjust the playback settings of the portable AED 104 to lower the volume to avoid disrupting the conversation. Similarly, when the portable AED 104 approaches a larger environment without any detectable users 102, the operation handler 300 may adjust the playback settings of the portable AED 104 to increase the volume. Moreover, the operation handler 300 may be implemented in a setting with multiple digital assistants 105. For instance, if a user 102 issues a query requesting a second AED to play music while the user 102 is in the proximity to a first AED 104 that is currently playing music, the operation handler 300 may perform media arbitration and determine that the query includes an implicit command to stop playback of the music on the first AED 104.

Figure 4:
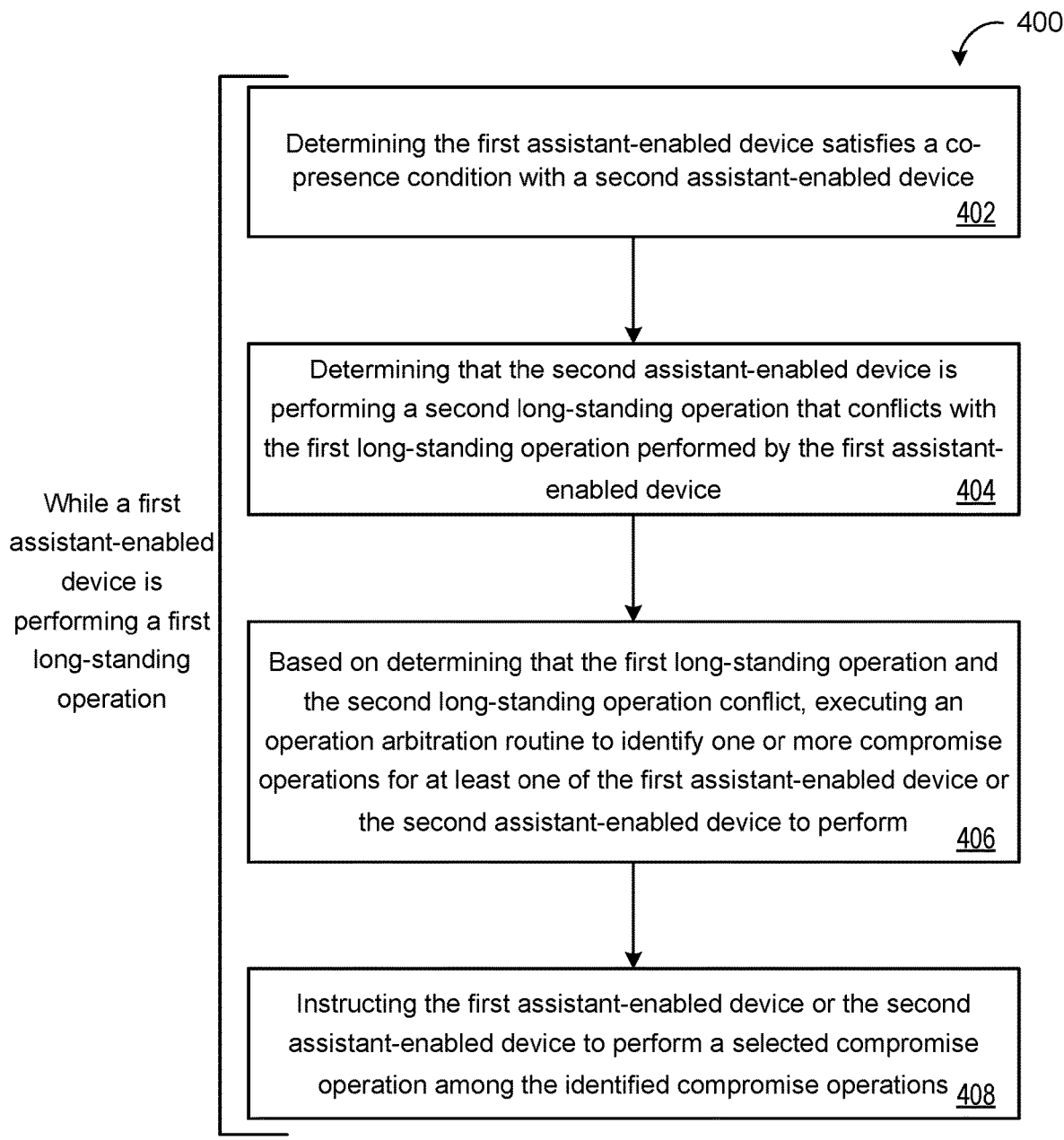
FIG. 4 is a flowchart of an example arrangement of operations for a method of performing media arbitration between two or more devices.

FIG. 4 includes a flowchart of an example arrangement of operations for a method 400 for performing media arbitration between two or more devices. While a first assistant-enabled device 102 is performing a first long-standing operation 111, the method 400 includes, at operation 402, determining the first assistant-enabled device 102, 104a satisfies a co-presence condition with a second assistant-enabled device 102, 102b. At operation 404, the method 400 also includes determining that the second assistant-enable device 102b is performing a second long-standing operation 112 that conflicts with the first long-standing operation 111 performed by the first assistant-enabled device 104a. Based on determining that the first long-standing operation 111 and the second long-standing operation 112 conflict, the method 400 further includes, at operation 405, executing an operation arbitration routine 340 to identify one or more compromise operations 344 for at least one of the first assistant-enabled device 104a or the second assistant-enabled device 104b to perform. At operation 408, the method 400 also includes instructing the first assistant-enabled device 104a or the second assistant-enabled device 104b to perform a selected compromise operation 344 among the identified compromise operations 344.

Figure 5:
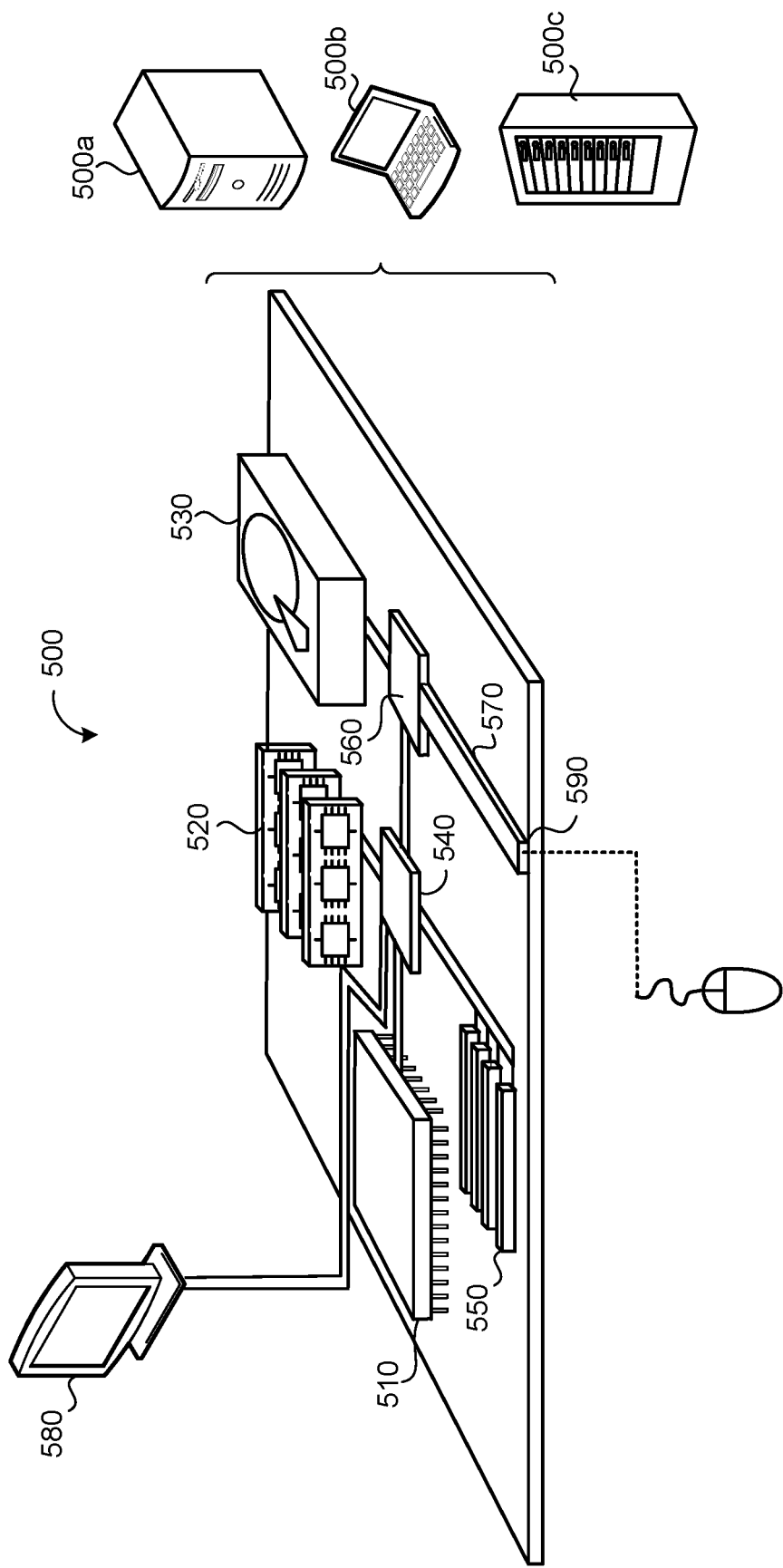
FIG. 5 is a schematic view of an example computing device that may be used to implement the systems and methods described herein.

FIG. 5 is a schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 (e.g., the data processing hardware 10 and/or the remote data processing hardware 132 of FIGS. 1A-1C) can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 (e.g., the memory hardware 12 and/or the remote memory hardware 134 of FIGS. 1A-1C) stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500*a* or multiple times in a group of such servers 500*a*, as a laptop computer 500*b*, or as part of a rack server system 500*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware that causes the data processing hardware to perform operations comprising:
   while a first assistant-enabled device is performing a long-standing operation, receiving connection data indicating the first assistant-enabled device is connected to a second assistant-enabled device; and
   based on receiving the connection data indicating the first assistant-enabled device is connected to the second assistant-enabled device:
      identifying one or more compromise operations associated with simultaneously performing the long-standing operation on the first and second assistant-enabled devices;
      determining a respective score associated with each compromise operation among the one or more compromise operations;

selecting the compromise operation among the one or more compromise operations having the highest respective score as the compromise operation for at least one of the first assistant-enabled device or the second assistant-enabled devices to perform;

determining to adjust respective media content playback settings of the first assistant-enabled device and the second assistant-enabled device; and instructing the first and second assistant-enabled devices to:

perform the long-standing operation simultaneously; and adjust the respective media content playback settings.

2. The computer-implemented method of claim 1, wherein the operations further comprise:

obtaining a capability of the first assistant-enabled device; and obtaining a capability of the second assistant-enabled device;

wherein identifying the one or more compromise operations is based on the capability of the first assistant-enabled device and the second assistant-enabled device.

3. The computer-implemented method of claim 1, wherein the operations further comprise:

identifying a device type associated with the first assistant-enabled device; and identifying a device type associated with the second assistant-enabled device;

wherein identifying the one or more compromise operations is based on the device type associated with the first assistant-enabled device and the device type associated with the second assistant-enabled device.

4. The computer-implemented method of claim 1, wherein the operations further comprise:

identifying an operation context associated with the first assistant-enabled device; and identifying an operation context associated with the second assistant-enabled device;

wherein identifying the one or more compromise operations is based on the operation context associated with the first assistant-enabled device and the operation context associated with the second assistant-enabled device.

5. The computer-implemented method of claim 1, wherein the operations further comprise:

identifying a user preference associated with the first assistant-enabled device; and identifying a user preference associated with the second assistant-enable device;

wherein identifying the one or more compromise operations is based on the user preference associated with the first assistant-enabled device and the user preference associated with the second assistant-enabled device.

6. The computer-implemented method of claim 1, wherein the operations further comprise:

determining that the respective score associated with the selected compromise operation satisfies a threshold; and instructing at least one of the first assistant-enabled device or the second assistant-enabled device to perform the selected compromise operation based on the respective score associated with the selected compromise operation satisfying the threshold.

7. The computer-implemented method of claim 1, wherein the first assistant-enabled device comprises a first smart speaker.

8. The computer-implemented method of claim 7, wherein the second assistant-enabled device comprises a second smart speaker different than the first smart speaker.

9. The computer-implemented method of claim 1, wherein the respective media content playback settings of the first assistant-enabled device and the second assistant-enabled device comprise respective volume levels for output of audible content.

10. A system comprising:

data processing hardware; and memory hardware in communication with the data processing hardware, the memory hardware storing instructions that, when executed on the data processing hardware, cause the data processing hardware to perform operations comprising:

while a first assistant-enabled device is performing a long-standing operation, receiving connection data indicating the first assistant-enabled device is connected to a second assistant-enabled device; and based on receiving the connection data indicating the first assistant-enabled device is connected to the second assistant-enabled device:

determining one or more compromise operations associated with simultaneously performing the long-standing operation on the first and second assistant-enabled devices;

determining a respective score associated with each compromise operation among the one or more compromise operations;

selecting the compromise operation among the one or more compromise operations having the highest respective score as the compromise operation for at least one of the first assistant-enabled device or the second assistant-enabled device to perform;

determining to adjust respective media content playback settings of the first assistant-enabled device and the second assistant-enabled device; and instructing the first and second assistant-enabled devices to:

perform the long-standing operation simultaneously; and adjust the respective media content playback settings.

11. The system of claim 10, wherein the operations further comprise:

obtaining a capability of the first assistant-enabled device; and obtaining a capability of the second assistant-enabled device;

wherein identifying the one or more compromise operations is based on the capability of the first assistant-enabled device and the second assistant-enabled device.

12. The system of claim 10, wherein the operations further comprise:

identifying a device type associated with the first assistant-enabled device; and identifying a device type associated with the second assistant-enabled device;

wherein identifying the one or more compromise operations is based on the device type associated with the first assistant-enabled device and the device type associated with the second assistant-enabled device.

13. The system of claim 10, wherein the operations further comprise:
 identifying an operation context associated with the first assistant-enabled device; and
 identifying an operation context associated with the second assistant-enabled device;
 wherein identifying the one or more compromise operations is based on the operation context associated with the first assistant-enabled device and the operation context associated with the second assistant-enabled device.

14. The system of claim 10, wherein the operations further comprise:
 identifying a user preference associated with the first assistant-enabled device; and
 identifying a user preference associated with the second assistant-enable device;
 wherein identifying the one or more compromise operations is based on the user preference associated with the first assistant-enabled device and the user preference associated with the second assistant-enabled device.

15. The system of claim 10, wherein the operations further comprise:
 determining that the respective score associated with the selected compromise operation satisfies a threshold; and
 instructing at least one of the first assistant-enabled device or the second assistant-enabled device to perform the selected compromise operation based on the respective score associated with the selected compromise operation satisfying the threshold.

16. The system of claim 10, wherein the first assistant-enabled device comprises a first smart speaker.

17. The system of claim 16, wherein the second assistant-enabled device comprises a second smart speaker different than the first smart speaker.

18. The system of claim 10, wherein the respective media content playback settings of the first assistant-enabled device and the second assistant-enabled device comprise respective volume levels for output of audible content.

* * * * *